United States Patent [19]
Fallon

[11] Patent Number: 5,646,723
[45] Date of Patent: Jul. 8, 1997

[54] COMBINED EARTH SENSOR

[75] Inventor: James J. Fallon, Bronxville, N.Y.

[73] Assignee: Space Sciences Corporation, White Plains, N.Y.

[21] Appl. No.: 404,181

[22] Filed: Mar. 13, 1995

[51] Int. Cl.$^6$ .............. G01B 11/26; B64G 1/36; G01J 5/02
[52] U.S. Cl. .............. 356/139.01; 244/171; 250/202; 250/339.02; 356/139.03
[58] Field of Search ............. 244/171; 250/202, 250/339.02; 356/139.01, 139.03

[56] References Cited

U.S. PATENT DOCUMENTS

| | | |
|---|---|---|
| 3,576,999 | 5/1971 | Blythe et al. . |
| 3,657,549 | 4/1972 | Low et al. . |
| 5,455,424 | 10/1995 | Doctor .................. 250/349 |

Primary Examiner—Stephen C. Buczinski
Attorney, Agent, or Firm—Mark P. Stone

[57] ABSTRACT

An earth sensor for use in orbiting satellites over an altitude range between low earth orbit (LEO) and geosynchronous orbit (GEO) and beyond employs a combination of both visible wavelength senor technology and infrared (IR) sensor technology to result in high accuracy capability. During the vast majority of an orbit of the satellite, the sensor is operating in the visible region using reflected sunlight from the earth horizon. During the relatively small time period of the orbit when the sun is behind the earth and it is not possible to operate the sensor in the visible region, precise attitude information is generated by earth radiance balance operating in the IR region. The sensor therefore exhibits the known advantages and accuracy of operation in the visible region for a major portion of an orbit of a satellite, but also maintains attitude control of the satellite during a relatively small portion of the orbit when operation in the visible region is not possible.

20 Claims, 5 Drawing Sheets

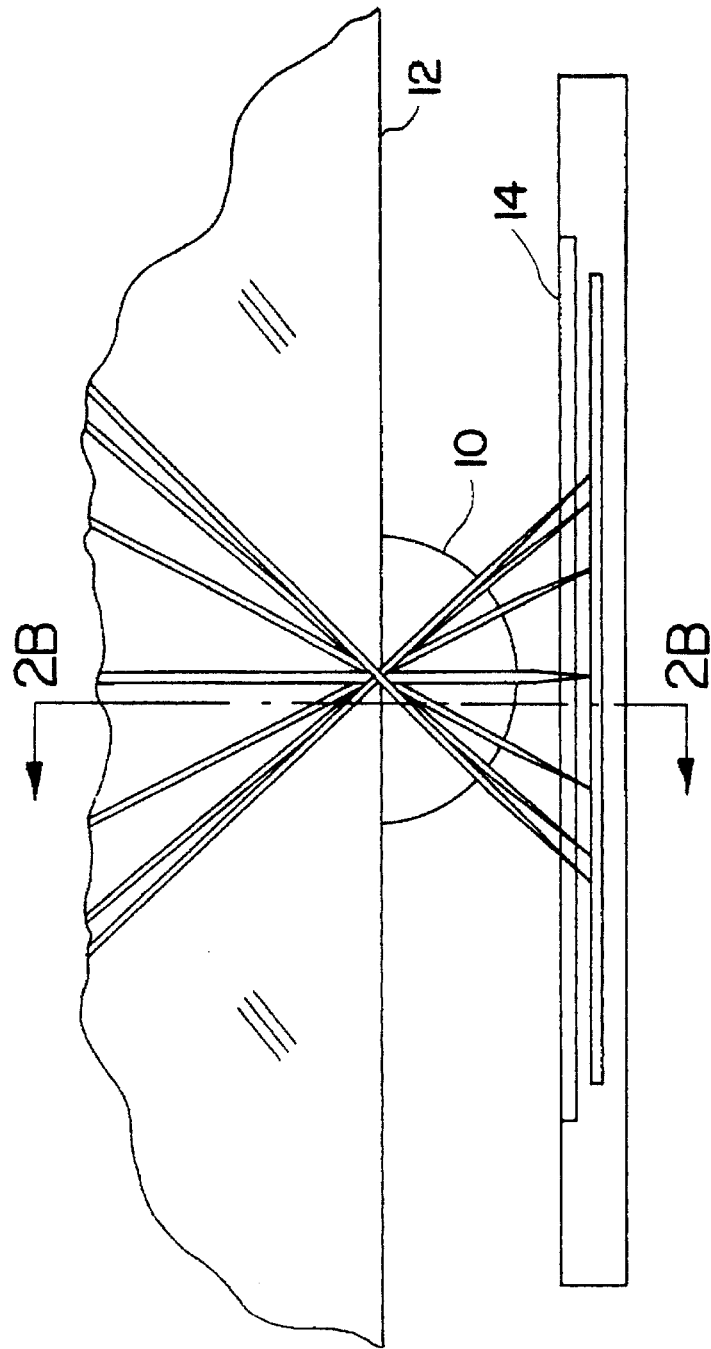

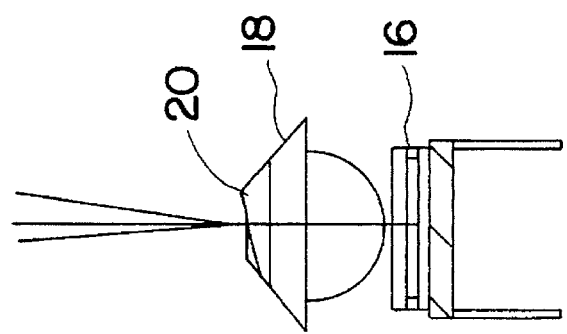
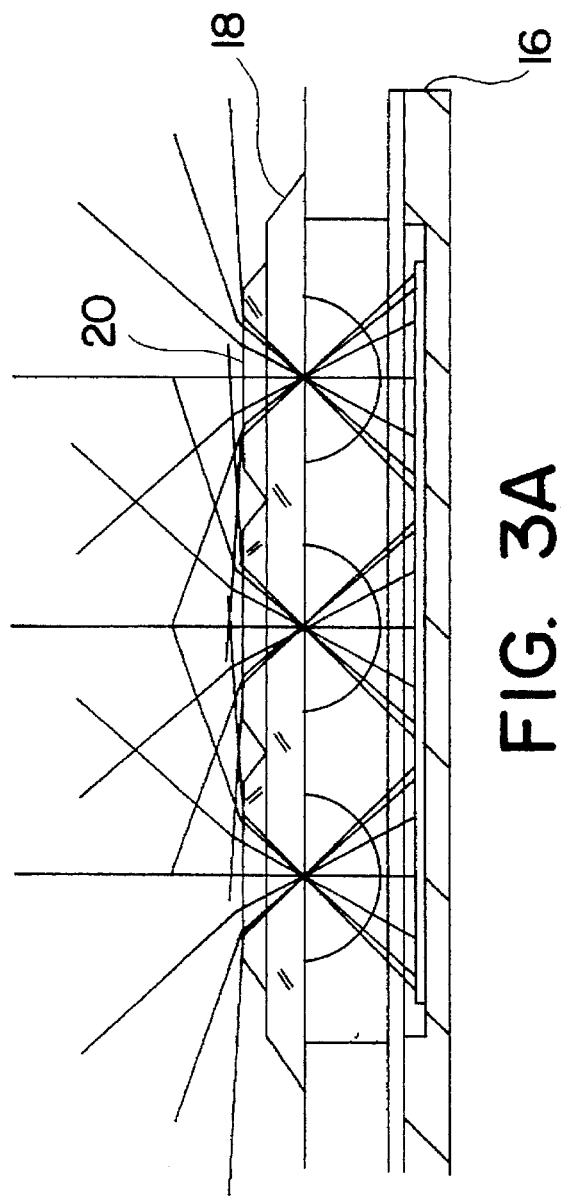

COMBINED EARTH SENSOR

BACKGROUND OF THE INVENTION

The present invention is directed to a sensor for indicating orientation of a satellite on which the sensor is mounted, and more particularly to an earth sensor. Sensors of the type in accordance with the present invention are generally mounted to satellites, space probes and the like, for sensing the horizon of the earth, and producing a signal indicating orientation of the satellite with respect to the earth around which the satellite is orbiting. The sensors are provided for attitude control and guidance of satellites. The attitude of a satellite is determined by its position with respect to three axes at right angles to each other. Typically, two of these axes are in a plane at right angles to a projected radius of the earth passing through the satellite and which are defined as pitch and roll, and the third axis coincides with a radius defined as yaw.

Earth sensors of the type generally known to the art are most efficient and economical when operating in the visible light region. However, earth sensors operating only in the visible region cannot easily maintain attitude control of the satellite during the portion of the orbit during which the sun is behind the earth and operation in the visible region is not possible. The use of a sensor operating in the IR region will correct this problem, but result in other disadantages including limited achievable accuracy over a wide altitude range as a result of inherent errors in the use of certain types of simple static IR earth sensors. Accordingly, attitude control of a satellite by either a sensor operating in the visible region or a sensor operating in the infrared region each result in disadvantages over the path of an entire orbit of the satellite.

It is the primary object of the present invention to provide a combined sensor exhibiting the advantages of visible sensing means throughout the entire orbit of the spacecraft, and minimizing errors resulting from the use of infrared sensing means during portions of the orbit when visible sensing means are inoperative.

SUMMARY OF THE INVENTION

The present invention provides an earth or horizon sensor for non-manned spacecraft for achieving high accuracy in an altitude range between low earth orbit (LEO) and geosynchronous orbit (GEO) and beyond. The sensor in accordance with the present invention employs both visible sensor means operating in the visible light wavelength range and cooperating IR sensor means operating in the infrared wavelength region.

For certain orbits of the spacecraft, particularly higher orbits, (e.g., geosynchronous orbit), the earth is illuminated for approximately 95–96% of the orbit by visible lightwaves comprising sunlight reflected from the earth's horizon. It is only for approximately for 4–5% of the path of the spacecraft in each orbit in Spring or Fall that the sun is behind the earth, and therefore operation of a sensor in the visible region is, in general, not possible. Therefore, the earth sensor on the spacecraft cannot operate in the visible wavelength for approximately one hour out of each twenty-four hour period of the spacecraft's geosynchronous orbit.

The use of a visible horizon sensor for 95%–96% of the spacecraft's GEO orbit is advantageous in several different respects. Known visible sensors include uncooled detectors, are inexpensive to procure, include no moving parts, and have high resolution and accuracy. Although the use and operation of a visible light sensor generally is precluded only during about 4%–5% of the time the spacecraft is in geosynchronous orbit, it is nonetheless desirable to maintain control of the spacecraft attitude during this time period. An infrared sensor, which is operatively associated with the visible light sensor, is employed for this purpose. Immediately prior to the portion of the orbit of the spacecraft when the sun is behind the earth, (thereby preventing operation of the visible sensor), the visible sensor transfers its settings to an IR sensor, which is capable of sensing the earth at all times. The output of the infrared sensor which has been transferred from the visible sensor is calibrated to be equivalent to the attitude of the spacecraft. The infrared sensor operates to monitor and control the attitude of the spacecraft during only the relatively small portion of the orbit when the visible sensor is out of its operating region. Although conventional infrared sensors exhibit inherent disadvantages (e.g., infrared sensors are subject to greater errors resulting from variations in temperature and emissivity of the earth the further the field of view drops below the horizon; thermal drifts result in relatively large errors when employing infrared sensors; and aging results in larger errors when employing infrared sensors), such errors become insignificant since the infrared sensor as employed in the present invention is in use only for 4–5% of the time in geosynchronous orbit. Thermal drift, aging, and errors resulting from seasonal variations on earth are insignificant because the infrared sensor is used only for one short continuous interval during each orbital period, e.g. one hour of each day that the spacecraft is in geosynchronous orbit. Accordingly, the temperature distribution on earth remains constant for each short continuous interval (e.g., one hour) that the infrared sensor is in operation, and therefore the infrared sensor holds the attitude of the spacecraft with a high degree of accuracy and with minimal error for each of the limited continuous time intervals in which the infrared sensor is operating. The infrared sensor, when used only for a relatively small portion of the orbit of the spacecraft, maintains the accuracy of the visible sensor which is used for a significantly larger portion of each geosynchronous orbit.

Although the above discussion primarily addresses higher altitude geosynchronous orbits in which the spacecraft generally is out of the visible sensor region for 4%–5% of the path of the orbit (representing 1 hour out of each 24 hour orbit time interval), the same considerations apply to lower orbits (LEO). Although the spacecraft generally is out of the visible sensor region for up to about 50% of the path of an orbit at LEO, the time to complete such orbit is approximately 1.5 hours. Therefore, the infrared sensors on the spacecraft are not operating for any continuous time intervals greater than approximately 0.75 hours (50% of the 1.5 hours to complete the low orbit).

The earth horizon sensor of the present invention advantageously combines cooperating visible and infrared sensor means to monitor and control the attitude of the spacecraft throughout its entire orbit, yet achieves the high accuracy and other advantages of the visible sensor means while minimizing the known disadvantages of the infrared sensor means.

BRIEF DESCRIPTION OF THE DRAWINGS

FIG. 2A illustrates a visible earth sensor single axis channel shows the short wavelength channels of the dual wavelength (visible and infrared) earth sensor in accordance with the present invention, and FIG. 2B is a section through FIG. 2A;

FIG. 3A illustrates a two axis visible region earth sensor including only a single silicon detector array in accordance with the present invention, and FIG. 3B is a side elevational view of FIG. 3A;

DESCRIPTION OF THE BEST MODES FOR CARRYING OUT THE INVENTION

The preferred embodiments of the combined visible/IR earth horizon sensor in accordance with the present invention will now be discussed with reference to FIGS. 1–5 of the drawings.

The sensor proposed herein achieves high accuracy over an altitude range of low earth orbit (LEO) up to geosynchronous orbit and beyond (GEO) with no moving parts, extreme radiation hardness, and extremely low weight and power.

This is accomplished using flight proven technologies from digital sun senors, developed and flown in space by Space Sciences Corporation, the Assignee of the present inventor. This visible region sensor technology is combined with a staring, simple radiance balance IR earth sensor, which maintains attitude control during the portions of the orbit where the sun is behind the earth and the spacecraft generally is out of the visible region. As used herein, the visible wavelength range (or visible region) is defined as substantially between 0.2–2.0 microns, and the IR wavelength range (or non-visible region) is defined as substantially between 8.0–20.0 microns.

Figure 1:
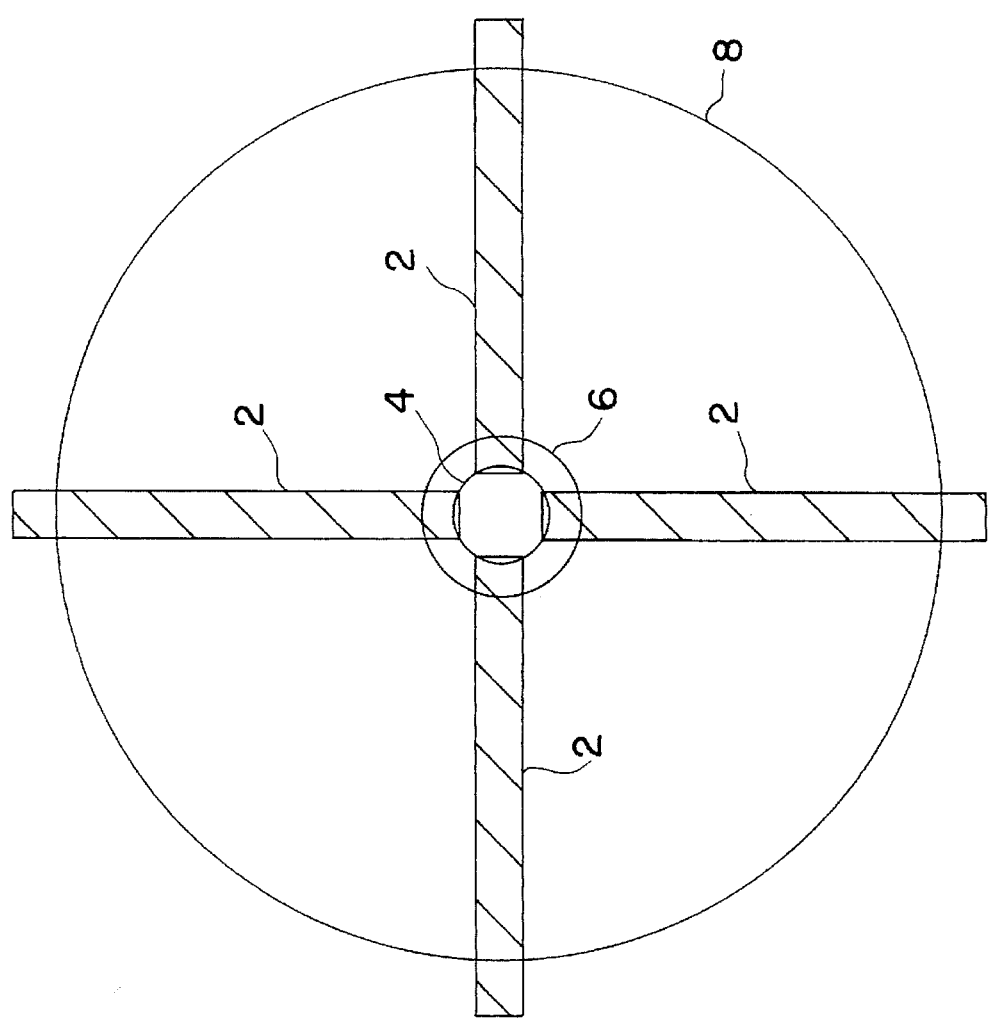
FIG. 1 illustrates a visible-infrared earth channel field arrangement in accordance with the combined visible-infrared horizon sensor of the present invention.

High accuracy capability is achieved using silicon detector arrays operating in the visible and near IR wavelength regions, using reflected sunlight from the earth horizon. These arrays typically have 2048 pixels and, as is shown in FIG. 1, subtend 172°. Two of these sensors, with their fields crossed at the nadir of the earth, can provide two axis attitude readout and control from LEO to GEO, as long as there are illuminated earth horizons at 270° of the earth's periphery if spacecraft altitude is not known. If spacecraft altitude is known (as is usually the case) only 180° of the earth periphery need be illuminated, which is always the case when the sun is not behind the earth. In highly circular orbits such as are used in geosynchronous and ½ geosynchronous applications, the orbit altitude is exactly known and maintained (Otherwise a drift in the spacecraft position in the orbit would result).

For the portion of the orbit when the sun is behind the earth, the precise attitude controlled by the silicon arrays is maintained by four IR radiance balance fields 2 superimposed on the silicon array fields, as is shown in FIG. 1. Reference numeral 4 illustrates geosynchronous altitude, reference numeral 6 illustrates an altitude of 10.898 N. miles, and reference numeral 8 illustrates an altitude of 100 N. miles. These radiance balance fields are achieved using vacuum deposited thermopiles with simple linear differential amplifiers reading their outputs. The IR channels operate in the 14–16 um atmospheric $CO_2$ band, which prevents them from seeing cold clouds and also minimizes other error-producing thermal emissions from the earth. Although the IR fields can obtain earth attitude signals for the entire orbit at any altitude, such simple IR radiance balance systems have historically been severely limited in their achievable accuracy over wide altitude ranges because of earth seasonal radiance variations even in the $CO_2$ band. Furthermore, thermal drifts and responsivity aging in the thermopiles might result in large errors over time and over typical thermal environments, rendering them unsuitable for use in wide altitude range orbits.

However, by correcting these IR offset errors using the silicon arrays once per orbit (every 100 minutes) at LEO or, over 90% of the orbit at ½ GEO and at GEO, when the abovementioned visbile horizons are illuminated, a combined high accuracy earth sensor system can be achieved over these altitude ranges. At GEO and ½ GEO, the earth subtenses are 17.45° and 27.76° respectively. For the GEO 24 hour orbit period, the worst case 17.45° subtense represents a sun occultation period of 17.45°/360°)×24=1.16 hours. At ½ GEO, which has a 12 hour period, the 27.76° earth subtense represents a sun occultation period of 27.26°/360°)×12=0.908 hour (worst case). Therefore, in all of these cases, the maximum time between visible channel correction of the IR channel is substantially 1.1 hours.

The detail parameters of a combined (visible and IR) earth sensor system in accordance with the present invention, and a quantitative analysis of the sensor performance, are described as follows.

FIG. 2 of the drawings illustrates one configuration of the short wavelength channels of the dual wavelength earth sensor. For proper earth sensor operation, since the sun-illuminated earth is an extended source, and at low altitudes, the edge of the earth atmosphere subtends a finite angle, a sharp image of the earth is desirable. This is accomplished with a hemispherical fused silica lens, 10 cemented to the rear of the sensor thick window, 12 which contains a pinhole aperture at the center of curvature of the hemisphere. The hemisphere then becomes a minimum abberation focusing lens, producing a spherical focal surface. However, because of the small diameter of the pinhole aperture, the f/no of this convergent beam is very large, and adequate earth image sharpness occurs on the flat plane of the linear array 14 without the use of a field flattening optical element.

In operation, at both LEO and GEO, when the horizons are sun illuminated, the short wavelength channels accurately determine the two axis attitude of the spacecraft to an accuracy of better than ±0.1° because the 172° field of view of the array covers over 1000 pixels. Assuming a digital readout worst case accuracy±LSB, where the LSB in the linear silicon array is 172°/1200=0.14°, the resulting worst case error is ±0.07°.

Figure 4:
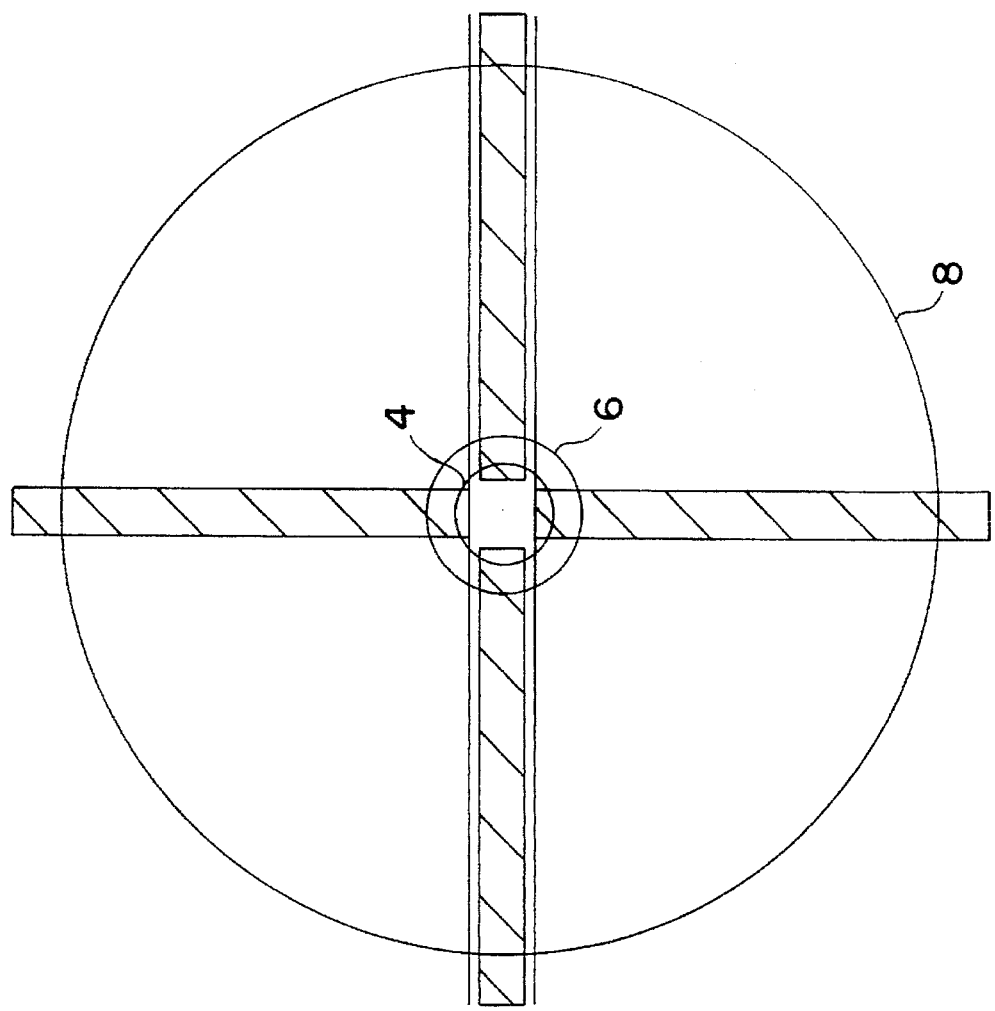
FIG. 4 illustrates the field orientation of the earth sensor illustrated by FIG. 3 for a dual wavelength parallel visible field earth sensor in accordance with the present invention.

FIG. 3 shows a simpler configuration of the visible earth sensor, designed for operation with higher roll accuracy at GEO and ½ GEO than at LEO. The field orientation of this simpler configuration illustrated by FIG. 3 is shown in FIG. 4. As can be seen, the visible fields are arranged in parallel, rather than in the orthogonal orientation shown in FIG. 1. In this field orientation, pitch attitude (i.e., earth movement along the scan lines) is obtained as the average phase of the earth horizon edges in the three parallel scans, while roll attitude (i.e., earth movement orthogonal to the scan lines), is obtained as a function of the relative phase shifts of the earth edges in the three parallel scans. Although the geometric gain in sensor output about the roll axis is relatively low at LEO, it is equivalent or superior to the pitch geometric gain at GEO and ½ GEO. However, the major simplification allowed by the optical configuration shown in FIG. 3, which increases reliability and reduces cost because of lower parts count, makes this field arrangement desireable.

The configuration shown in FIG. 3 achieves two axis attitude readout with only one silicon detector array 16 and its associated electronic processing, while two silicon detector arrays are required for a two axis attitude readout system by the configuration shown in FIG. 2. This is accomplished by projecting three images of sections of a single silicon array on the earth through the use of three "0.004" apertures located along the array. The images of the array sections are deviated ±6° in a plane orthogonal to the plane of the array through the use of two glass prisms. The third image of the array is undeviated to achieve the third scan shown in FIG. 4, (in which the altitudes are designated by the same reference numerals used in FIG. 1) thus allowing at least three earth horizon edges to be seen for any phase of illumination of the earth. Since three points on its periphery define the center of a circle, this arrangement achieves two axis attitude readout. Reference numeral 16 illustrates the silicon detector array, reference numeral 18 illustrates a fused silica window, and reference numeral 20 illustrates two fused silicon prisms.

During the portion of the orbit of the spacecraft when the earth is sun-illuminated, the short wavelength measured two axis off-null position of the earth (if any) is stored in a Field Programmable Gate Array (FPGA), or other equivalent digital storage means, which is part of the sensor, and is continually compared to the digitized equivalent two axis offset generated by the analog voltage output of the IR radiance balance channels. At LEO, because of the large field extent of the IR fields below the earth horizon, there are large radiance errors built into the IR channel raw readouts, but these are entirely compensated for during the sun illuminated portion of the portion by the short wavelength channels. These error compensation values are continously applied to the outputs of the IR channels for the dark portion of the orbit, and the IR channels continue to perform the attitude control function to the offset-corrected "homing point". A detailed analysis of the localized earth radiance variations in the four IR fields at LEO for all orbit inclinations is beyond the scope of this disclosure but it can be generally stated that the seasonal earth radiance, variations which form the predominant portion of the radiance variations error can be, to a large degree, compensated for by using this technique. As discussed above, the instrument aging errors are negligible in the short time period between short wavelength attitude updates during which the IR sensor is in operation so there is no need for complex offset radiance sources or other instrument thermal offset error compensating subsystems historically required in staring IR earth sensors. At the mission orbit (i.e. GEO or ½ GEO) as can be seen in FIG. 1, the IR fields do not protrude into the earth with large angles. Therefore the raw radiance errors for these IR field are commensurately smaller. Furthermore, at GEO for equatorial orbits, the IR fields see essentially constant earth radiances on a daily basis, and these radiances change only with season.

Figure 5A:
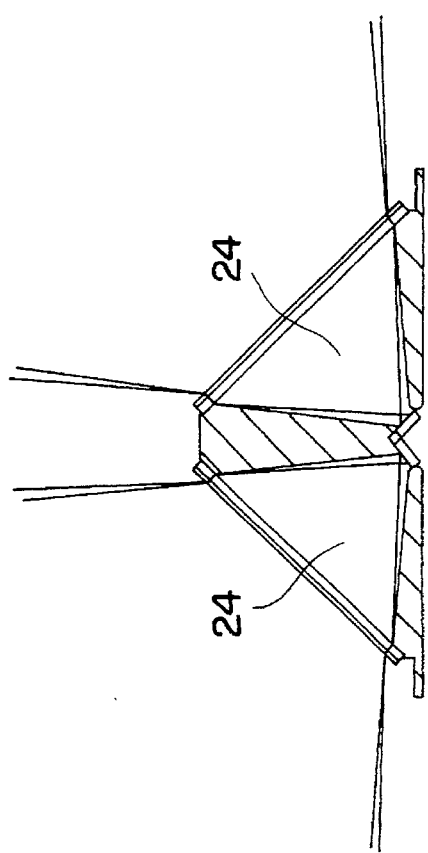
FIGS. 5A, 5B and 5C illustrate an infrared earth sensor single axis channel which can be used together with either of the visible earth sensors illustrated by FIGS. 2A, 2B and 4, in accordance with the present invention.
Figure 5C:
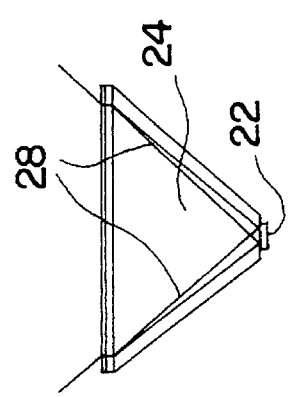
Figure 5B:
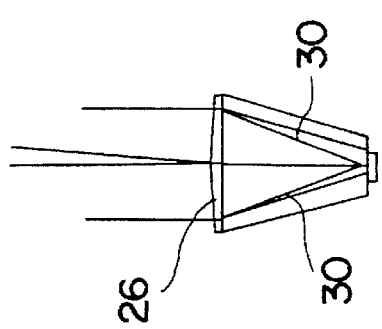

The optical configuration of the IR channel used with either of the above visible sensors is shown in FIG. 5. Each 80°×8.6° field is covered by a single 2 mm.×2 mm. thermopile 22 at the apex of a trough reflector. This reflector 24 having reflective walls 30 provides an optical speed approaching f/0.5 in one plane, thereby maximizing the signal-to-noise ratio for the thermopile channel. The edges of the Image Polygon of thermopile detector images, produced by the reflective trough, defines the focal plane for a germanium cylindrical lens, 26 which incorporates a 14-16 um bandpass filter coating. This cylindrical lens, combined with the trough reflector, provides a sharp edge field in one plane of 8.6°. In the other plane, where the cylindrical lens has no optical power, the field is defined by the blackened edges 28 of the trough, and the edge blur is defined by the angular subtense of the thermopile. This edge blur is entirely adequate for a radiance balance system.

Other modifications and variations within the scope of the invention will be apparent to those skilled in the art. Accordingly, the above discussion of the preferred embodiments of the invention is intended to be illustrative only and not restrictive of the scope of the invention, said scope being defined by the following claims and all equivalents thereto.

I claim:

1. An earth horizon sensor for spacecraft orbiting the earth, said sensor comprising:

first visible wavelength sensing means, second non-visible wavelength sensing means operatively associated with said first visible wavelength sensing means, and means for selectively controlling the respective operating states of said first and second sensing means such that the attitude of said spacecraft is controlled by said first visible wavelength sensing means during portions of the orbit during which the earth is sun illuminated and the attitude of said spacecraft is controlled by said second non-visible wavelength sensing means during portions of the orbit during which the earth is not sun illuminated.

2. The sensor as claimed in claim 1 wherein said second non-visible wavelength sensing means comprises infrared sensing means.

3. The sensor as claimed in claim 2 wherein said means for selectively controlling the respective operating states of said first and second sensing means includes means for causing said second sensing means to be in its operating state only during portions of the orbit of said spacecraft during which said first sensing means are inoperative.

4. The sensor as claimed in claim 3 wherein said second sensing means is continuously in said respective operating state for not more than 10% of the path of each orbit of said spacecraft around the earth at geosynchronous orbit (GEO).

5. The sensor as claimed in claim 4 wherein said second sensing means is continuously in said respective operating state for not more than 50% of the path of each orbit of said spacecraft around the earth at low earth orbit (LEO).

6. The sensor as claimed in claim 2 wherein said first visible wavelength sensing means includes a single silicon detector array for achieving two axis attitude readout.

7. The sensor as claimed in claim 6 wherein said first visible wavelength sensing means provides visible fields arranged in a parallel orientation.

8. The sensor as claimed in claim 2 wherein said first visible wavelength sensing means includes at least two silicon detector arrays for achieving two axis attitude readouts.

9. The sensor as claimed in claim 8 wherein said first visible wavelength sensing means provides visible fields arranged in an orthogonal orientation.

10. The sensor as claimed in claim 1 wherein said first and second sensing means operate in an altitude range of said spacecraft between low earth orbit (LEO) and geosynchronous orbit (GEO).

11. The sensor as claimed in claim 1 wherein said first and second sensing means operate in an altitude of said spacecraft beyond geosynchronous orbit (GEO).

12. A method of sensing the horizon of the earth for indicating relative orientation of an orbiting spacecraft on which said sensor is mounted, the steps of said method including:

sensing visible wavelengths by first visible wavelength sensing means when the spacecraft is in a first portion of its orbit during which the earth horizon is sun-illuminated, sensing infrared wavelengths by a non-visible wavelength sensing means during a second portion of the orbit of the spacecraft when the earth horizon is not sun-illuminated, and controlling the attitude of said spacecraft during said first portion of said orbit by said sensed visible wavelengths, and controlling the attitude of said spacecraft during said second portion of said orbit by said sensed infrared wavelengths.

13. The method as claimed in claim 12 further including the step of selectively controlling the operating states of said visible wavelength sensing means and said infrared wavelength sensing means such that such infrared wavelength sensing means is in its operating state only during said portion of said orbit when the earth horizon is not sun-illuminated.

14. The method as claimed in claim 13 further including the step of controlling the operating state of said infrared wavelength sensing means such that said infrared wavelength sensing means is continuously in said operative state for not more than 10% of the path of each orbit of said spacecraft around said earth at geosynchronous orbit (GEO).

15. The method as claimed in claim 14 further including the step of controlling the operating state of said infrared wavelength sensing means such that said infrared wavelength sensing means is continuously in said operative state for not more than 50% of the path of each orbit of said spacecraft around said earth at low earth orbit (LEO).

16. The method as claimed in claim 12 further including the step of arranging visible fields sensed by said visible sensing means in a parallel orientation.

17. The method as claimed in claim 12 further including the step of arranging visible fields sensed by said visible sensing means in orthogonal orientation.

18. The method as claimed in claim 16 including the step of providing said visible wavelength sensing means with only a single silicon detector array for achieving two axis attitude readout.

19. The method as claimed in claim 17 further including the step of providing said visible wavelength sensing means with at least two silicon detector arrays for achieving two axis attitude readout.

20. The method as claimed in claim 12 further including the step of sensing the horizon of the earth when said spacecraft is orbiting the earth at an altitude range of between low earth orbit (LEO) and geosynchronous orbit (GEO) and beyond.

* * * * *